United States Patent
Yoshimura et al.

(10) Patent No.: US 7,345,724 B2
(45) Date of Patent: Mar. 18, 2008

(54) PROJECTOR AND LIQUID CRYSTAL PANEL UNIT FOR USE IN PROJECTOR WITH OPTICAL SHEET EDGE-TILTING MECHANISM

(75) Inventors: Taichi Yoshimura, Osaka (JP); Yoshihiro Furuta, Neyagawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 313 days.

(21) Appl. No.: 11/186,773

(22) Filed: Jul. 22, 2005

(65) Prior Publication Data

US 2006/0017861 A1    Jan. 26, 2006

(30) Foreign Application Priority Data

Jul. 26, 2004    (JP) .............................. 2004-217049

(51) Int. Cl.
*G02F 1/1335*    (2006.01)

(52) U.S. Cl. ........................ 349/117; 349/5; 349/58; 349/118

(58) Field of Classification Search ............. 349/5–10, 349/117–121, 58

See application file for complete search history.

(56) References Cited

U.S. PATENT DOCUMENTS 5,157,523 A * 10/1992 Yamagishi et al. ............ 349/8
5,490,006 A * 2/1996 Masumoto et al. ......... 349/117
6,556,266 B1 * 4/2003 Shirochi et al. ............ 349/118
6,885,422 B2 * 4/2005 Suzuki et al. ............... 349/121
7,097,306 B2 * 8/2006 Furuta et al. ................. 353/20
7,110,053 B2 * 9/2006 Shimizu ........................ 349/9
2002/0018162 A1    2/2002 Suzuki et al.

FOREIGN PATENT DOCUMENTS

| EP | 1 160 617 A1 | 12/2001 |
| JP | 2003-051357 A | 2/2003 |
| JP | 2004-205593 A | 7/2004 |

OTHER PUBLICATIONS

European Search Report dated Nov. 30, 2006, issued in European Patent Application No. 05 01 6093.

* cited by examiner

*Primary Examiner*—Andrew Schechter
*Assistant Examiner*—John Heyman
(74) *Attorney, Agent, or Firm*—Westerman, Hattori, Daniels & Adrian, LLP.

(57)    ABSTRACT

A projector includes: a liquid crystal panel in which liquid crystal molecules to be irradiated with light from a light source are sealed; a polarizing plate disposed in a position to face the liquid crystal panel; and an optical compensation sheet disposed between the polarizing plate and the liquid crystal panel and compensating birefringence of the liquid crystal molecules. The optical compensation sheet can be adjusted by being swung in a plane orthogonal to the optical axis, and its normal can be adjusted so as to be tilted from the optical axis.

5 Claims, 11 Drawing Sheets

F I G. 4
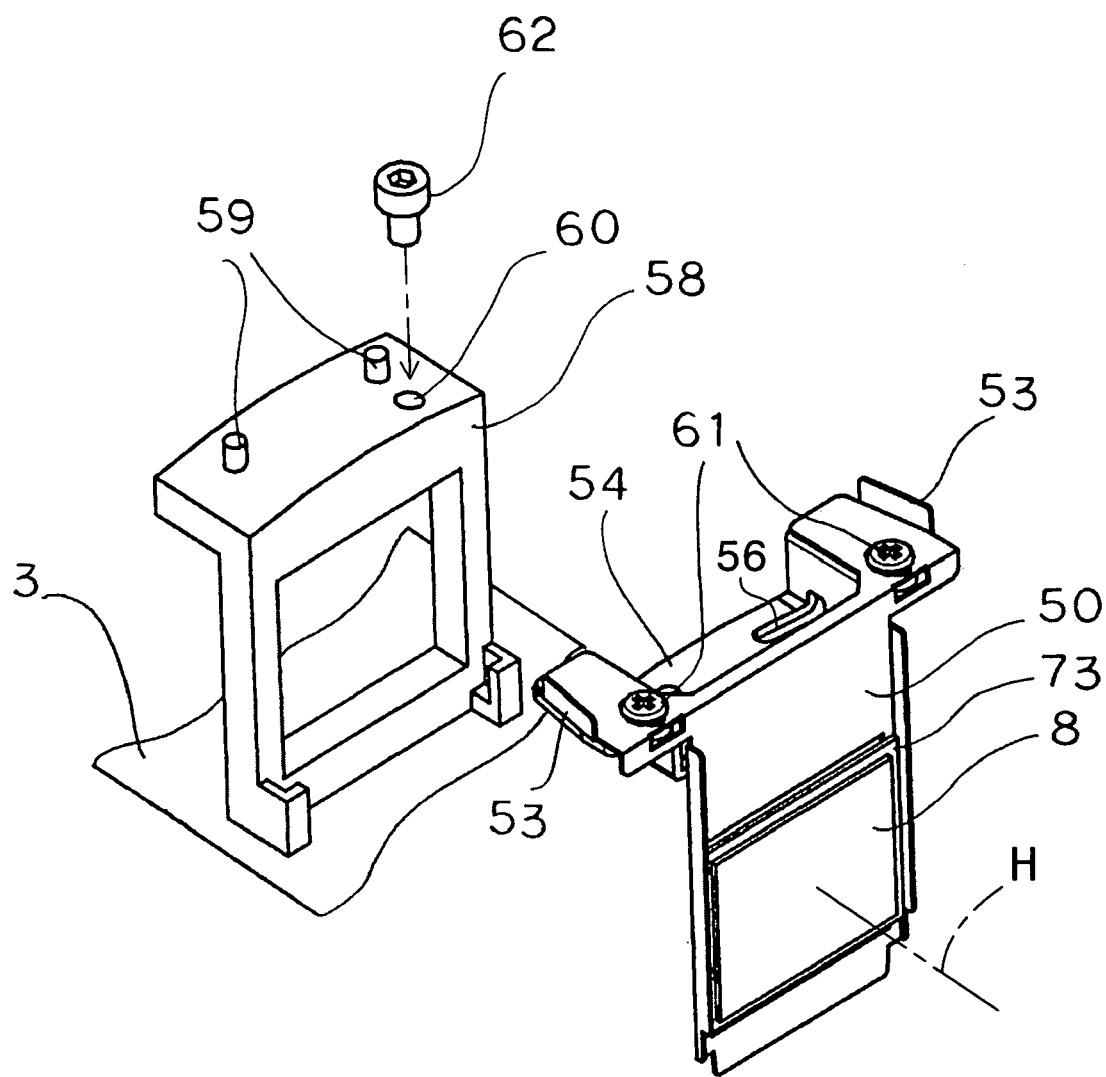

F I G. 7
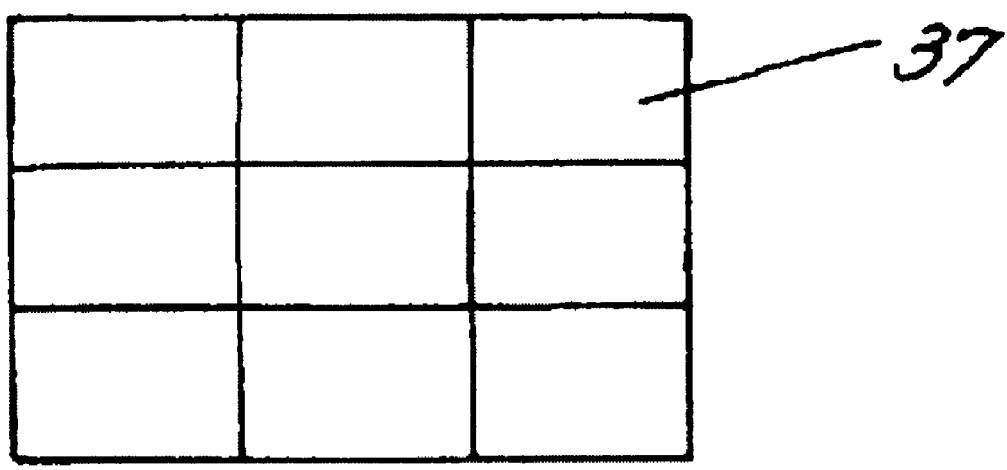

FIG. 11(a) PRIOR ART
FIG. 11(b) PRIOR ART
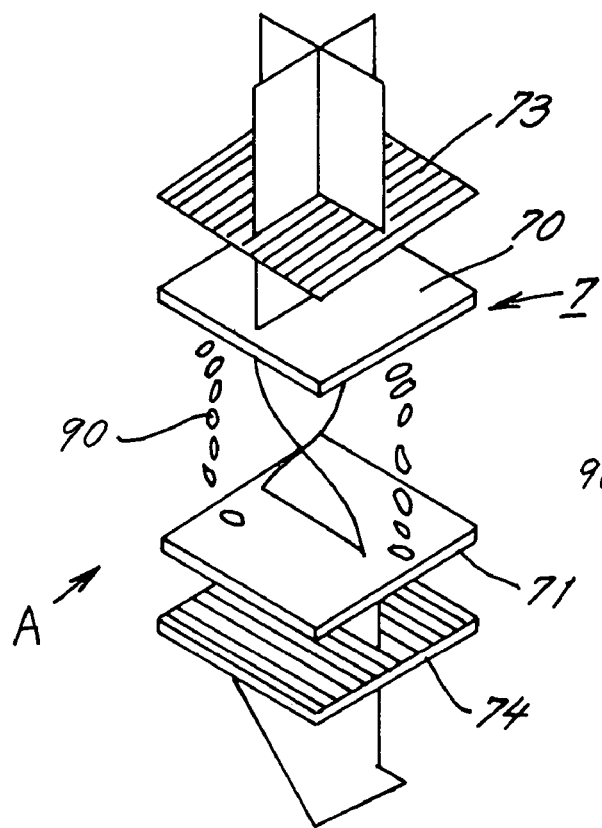
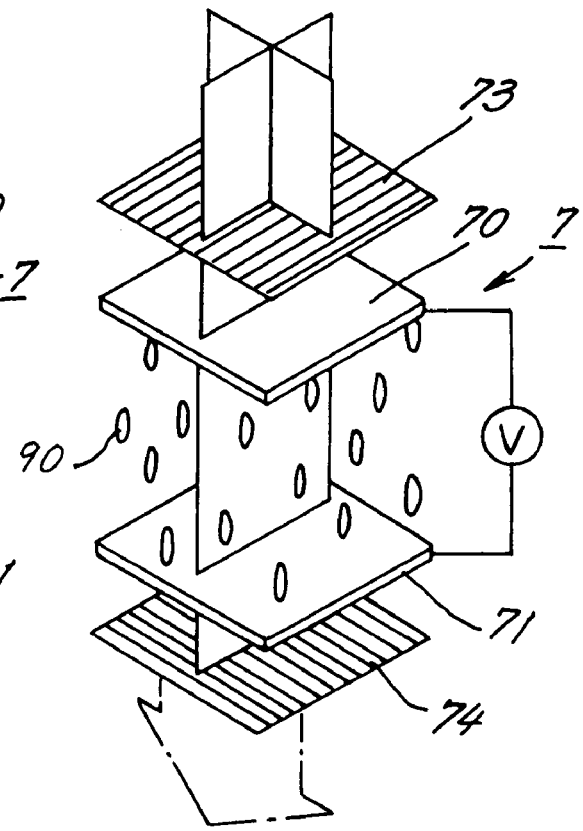

PROJECTOR AND LIQUID CRYSTAL PANEL UNIT FOR USE IN PROJECTOR WITH OPTICAL SHEET EDGE-TILTING MECHANISM

BACKGROUND OF THE INVENTION

1. Field of the Invention

The present invention relates to a projector in which an optical compensation sheet is disposed between a liquid crystal panel and a polarizing plate.

2. Description of the Related Art

FIGS. 11A and 11B are exploded perspective views of a conventional liquid crystal panel 7 and polarizing plates 73 and 74 sandwiching the liquid crystal panel 7. FIG. 11A shows a state where no electric field is applied to the liquid crystal panel 7, and FIG. 11B shows a state where an electric field is applied to the liquid crystal panel 7. As it is known, the polarizing plates 73 and 74 permit passage of one of two pieces of polarized light orthogonal to each other, and have vibration planes of polarized light which is permitted to pass. The vibration planes are deviated from each other by 90 degrees.

The liquid crystal panel 7 is constructed by sealing liquid crystal molecules 90 in transparent display substrates 70 and 71. The display substrates 70 and 71 are subjected to a rubbing process, and the stick-shaped liquid crystal molecules 90 are confined in a twisted state between the display substrates 70 and 71.

When an electric field is not applied between the display substrates 70 and 71, as shown in FIG. 11A, polarized light passed through the polarizing plate 73 on the incidence side passes the polarizing plate 74 on the outgoing side while being turned by 90 degrees by the twist of the liquid crystal molecules 90. Therefore, a light image, that is, a white image is displayed on the liquid crystal panel 7.

When an electric field is applied between the display substrates 70 and 71, as shown in FIG. 11B, the liquid crystal molecules 90 are arranged vertically, and polarized light passed through the polarizing plate 73 on the incidence side passes in gaps among the liquid crystal molecules 90. Since the polarized light is blocked by the polarizing plate 74 on the outgoing side, a black image is displayed on the liquid crystal panel 7.

It is, however, known that, actually, the tilt angle of the liquid crystal molecules 90 changes continuously in the thickness direction of the liquid crystal panel 7 in the liquid crystal panel 7 in a state where an electric field is applied between the display substrates 70 and 71 as shown in FIG. 12. It is known that, in a state where an electric field is applied between the display substrates 70 and 71, light leaks due to birefringence of the liquid crystal molecules 90 positioned near the substrates 70 and 71, contrast deteriorates.

In recent years, higher packing density of an image is in demand. An apparatus for capturing a high-density image has to improve contrast between black and white in a projected image and obtain a clear image. As described above, when polarized light which is inherently to be blocked passes through the liquid crystal panel 7 due to birefringence of the liquid crystal molecules 90 as shown by an alternate long and short dash line as shown in FIG. 11B, a black image is not displayed at all. The birefringence denotes here that travel speed of light varies according to the direction of the vibration plane of the light. The direction of fast speed will be called a fast axis, and the direction of slow speed will be called a slow axis.

In view of this point, as shown in FIG. 12, the technique of providing optical compensation sheets 8 and 8a in which liquid crystal molecules 91 are arranged in the thickness direction between the liquid crystal panel 7 and the polarizing plates 73 and 74 on the incident/outgoing sides is proposed (refer to U.S. Patent Publication No. 2002/18162). The optical compensation sheets 8 and 8a are transparent sheets in which the liquid crystal molecules 91 each having an almost disc shape are arranged.

The tilt angle of the liquid crystal molecules 91 changes continuously in the thickness direction of the sheet, and the outermost liquid crystal molecules 91 are arranged almost horizontally. With the arrangement, the birefringence of the liquid crystal molecules 90 in the liquid crystal panel 7 is compensated, and light leaked from the liquid crystal panel 7 does not pass through the polarizing plate 74. Therefore, a black image is displayed perfectly on the liquid crystal panel 7 and the contrast can be enhanced.

The alignment direction of the liquid crystal molecules 91 in the optical compensation sheets 8 and 8a has to be parallel with that of the display substrates 70 and 71.

However, there is a case that the alignment direction of the liquid crystal molecules 91 in the optical compensation sheets 8 and 8a is not parallel with that of the display substrates 70 and 71 due to an error of mounting of the optical compensation sheets 8 and 8a to the polarizing sheets 73 and 74.

As shown in FIG. 13, the optical compensation sheet 8 is cut in a necessary size from a film sheet 85. There is a case that the cut line is erroneously deviated from a normal position as shown by broken lines.

Such an optical compensation sheet 8 also transmits light to be inherently blocked since the alignment direction of the liquid crystal molecules 91 is deviated from the inherent position. As a result, a problem occurs that partial light leak occurs in a portion to be inherently displayed in black. Since the optical compensation sheet 8 is fixed, in the case where contrast deteriorates or display unevenness occurs, the optical compensation sheet 8 is replaced with another optical compensation sheet 8 having a different optical axis. Therefore, it is necessary to prepare optical compensation sheets having various optical axis, and it causes a problem such as occurrence of unnecessary stocks.

The present invention is directed to solve the problems.

SUMMARY OF THE INVENTION

According to a first aspect of the present invention to solve the problem, there is provided a projector including: a liquid crystal panel in which liquid crystal molecules to be irradiated with light from a light source are sealed; a polarizing plate disposed in a position to face the liquid crystal panel; and an optical compensation sheet disposed between the polarizing plate and the liquid crystal panel and compensating birefringence of the liquid crystal molecules, wherein the optical compensation sheet can be adjusted by being swung in a plane orthogonal to the optical axis and its normal can be adjusted so as to be tilted from the optical axis.

In the projector according to the invention, preferably, the optical compensation sheet is disposed on a light incidence side of the liquid crystal panel.

The optical compensation sheet may be disposed for a swing member which can be adjusted by being swung in a plane orthogonal to the optical axis and its normal can be adjusted so as to be tilted from the optical axis.

A polarizing plate may be disposed for the swing member.

According to a second aspect of the present invention for solving the problem, there is provided a liquid crystal panel unit including: a liquid crystal panel in which liquid crystal molecules to be irradiated with light from a light source are sealed; a polarizing plate disposed in a position to face the liquid crystal panel; and an optical compensation sheet disposed between the liquid crystal panel and the polarizing plate and compensating birefringence of the liquid crystal molecules, wherein the optical compensation sheet can be adjusted by being swung in a plane orthogonal to the optical axis and its normal can be adjusted so as to be tilted from the optical axis.

Operation and Effect

In the configuration according to the first aspect of the present invention, the slow axis of the liquid crystal molecules in the optical compensation sheet seen from the optical axis direction can be set almost parallel with the alignment direction of the liquid crystal molecules of the liquid crystal panel. In addition, the apparent slow axis of the optical compensation sheet can be made coincide with the slow axis in the optical axis direction of the liquid crystal molecules in the liquid crystal panel. Consequently, a uniform image having high contrast between black and white can be projected.

With the configuration of the present invention, by disposing the optical compensation sheet which can be adjusted by being tilted from the optical axis and can be adjusted by being swung in a plane orthogonal to the optical axis on the light incidence side of the liquid crystal panel, a shift of the optical axis can be prevented.

With the configuration of the present invention, the optical compensation sheet is disposed for a swing member which can be adjusted by being swung in a plane orthogonal to the optical axis and its normal can be adjusted so as to be tilted from the optical axis. Consequently, with the configuration, the optical compensation sheet can be adjusted swingably in the plane orthogonal to the optical axis and tiltably from the optical axis.

With the configuration of the present invention, the configuration can be simplified by integrating the polarizing plate and the optical compensation sheet, so that miniaturization can be achieved.

With the configuration of the present invention, a panel unit is provided with an optical compensation sheet which can be adjusted by being swung in a plane orthogonal to the optical axis and whose normal can be adjusted so as to be tilted from the optical axis. Thus, a panel unit capable of always stably projecting a uniform image can be constructed.

BRIEF DESCRIPTION OF THE DRAWINGS

FIG. 4 is a perspective view showing a state of assembling the swing mechanism of the projector;

FIG. 7 is a front view of a screen of the projector;

FIGS. 11A and 11B are exploded perspective views of a conventional liquid crystal panel and polarizing plates sandwiching the liquid crystal panel;

DETAILED DESCRIPTION OF PREFERRED EMBODIMENTS

First Embodiment

An embodiment of the present invention will be described in detail hereinbelow with reference to FIGS. 1 to 7.

Figure 1:
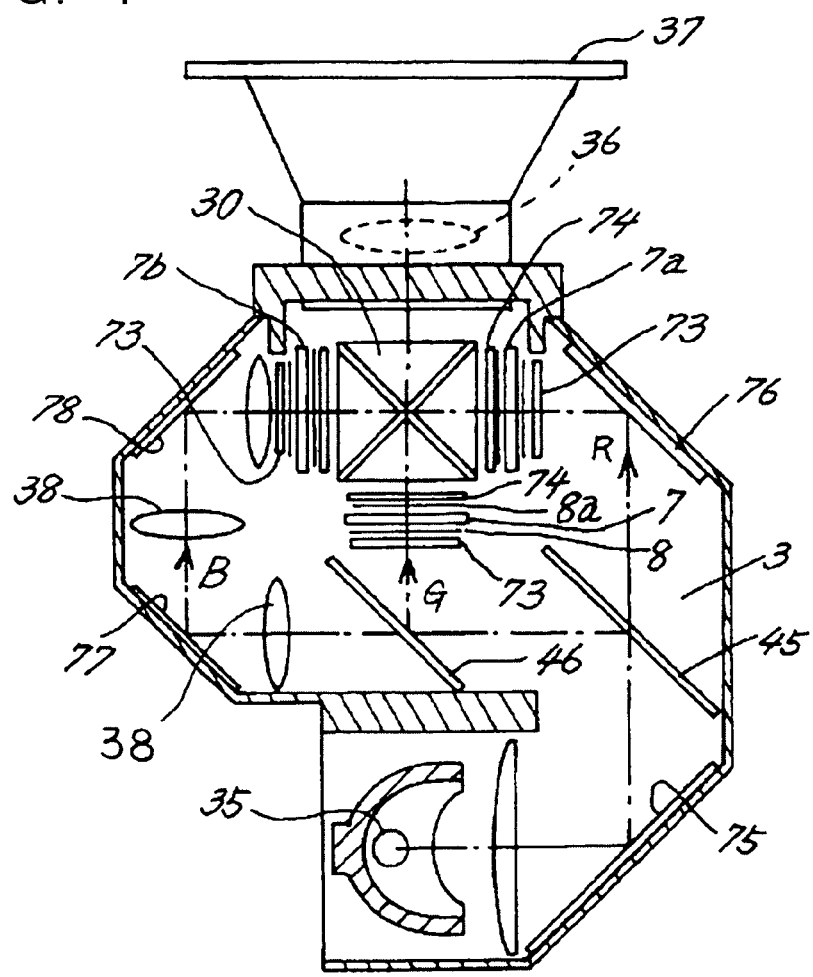
FIG. 1 is a plan view of a projector of a first embodiment of the present invention.

FIG. 1 is a plan view showing a projector according to the present invention. The projector has three liquid crystal panels 7, 7a, and 7b corresponding to green (G) light, red (R) light, and blue (B) light as the three primary colors of light on a chassis 3. The liquid crystal panels are irradiated with strong light from a light source 35, light fluxes passed through the liquid crystal panels are combined, and an image is formed via a projection lens 36.

In the chassis 3, the liquid crystal panels 7a and 7b corresponding to the red (R) light and the blue (B) light are disposed while sandwiching the optical axis of the projection lens 36, and a prism body 30 is disposed between the liquid crystal panels 7a and 7b. On the side opposite to the projection lens 36 over the prism body 30, the liquid crystal pane 17 corresponding to the green (G) light is disposed.

At the entrance of the optical path to the chassis 3, the light source 35 is disposed. On the optical path, total reflection mirrors 75, 76, 77, and 78 and dichroic mirrors 45 and 46 are disposed.

The light from the light source 35 is reflected by the total reflection mirror 75. After that, the green (G) light and the blue (B) light is reflected by the dichroic mirror 45, and the red (R) light passes through the dichroic mirror 45. The red (R) light passed through the dichroic mirror 45 is reflected by the total reflection mirror 76, travels to the liquid crystal panel 7a corresponding to the red (R) light, and is reflected toward the projection lens 36 by the prism body 30.

The green (G) light reflected by the dichroic mirror 45 is reflected by the dichroic mirror 46, travels to the liquid crystal panel 7 corresponding to the green (G) light, and is reflected toward the projection lens 36 by the prism body 30. The blue (B) light reflected by the dichroic mirror 45 passes through the dichroic mirror 46 and a relay lens 38 and is reflected by the total reflection mirror 77. After that, the blue (B) light travels to the liquid crystal panel 7b corresponding to the blue (B) light and is reflected by the prism body 30 toward the projection lens 36.

Figure 2:
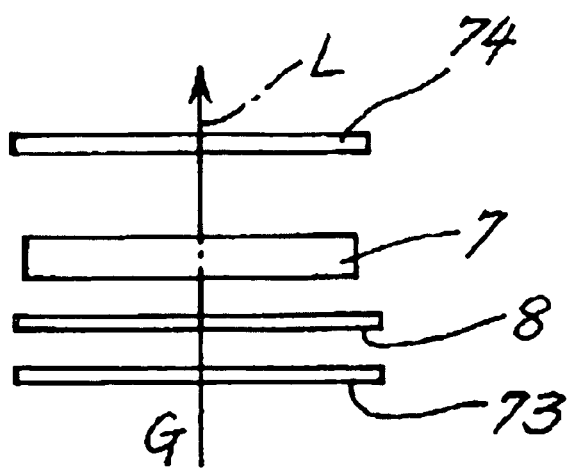
FIG. 2 is an enlarged plan view of a portion of a liquid crystal panel corresponding to green (G) light of the projector.

FIG. 2 is an enlarged plan view of a portion of the liquid crystal panel 7. The portion of each of the liquid crystal panels 7a and 7b has a configuration similar to that of the liquid crystal panel 7. For convenience of explanation, the liquid crystal panel 7 is illustrated here.

The polarizing plates 73 and 74 are disposed on the light incidence side and the outgoing side of the liquid crystal panel 7. As described above, the polarize light passed through the incidence-side polarizer 73 is twisted in the orthogonal direction in the liquid crystal panel 7 in a state where no electric field is applied to the liquid crystal panel 7 and passes through the polarizing plate 74 on the outgoing side.

Between the liquid crystal panel 7 and the incidence-side polarizing plate 73, an optical compensation sheet 8 on the incidence side for compensating birefringence of the liquid crystal molecules in the liquid crystal panel 7 is disposed. Between the liquid crystal panel 7 and the polarizing plate 74 on the outgoing side, no optical compensation sheet 8 is disposed. The incidence-side polarizing plate 73 and the incidence-side optical compensation sheet 8 are adjusted so as to be swingable in a plane orthogonal to an optical axis L as shown in FIG. 5 which will be described later, and a normal H of the optical compensation sheet 8 is adjusted to be inclined from the optical axis L.

Figure 3:
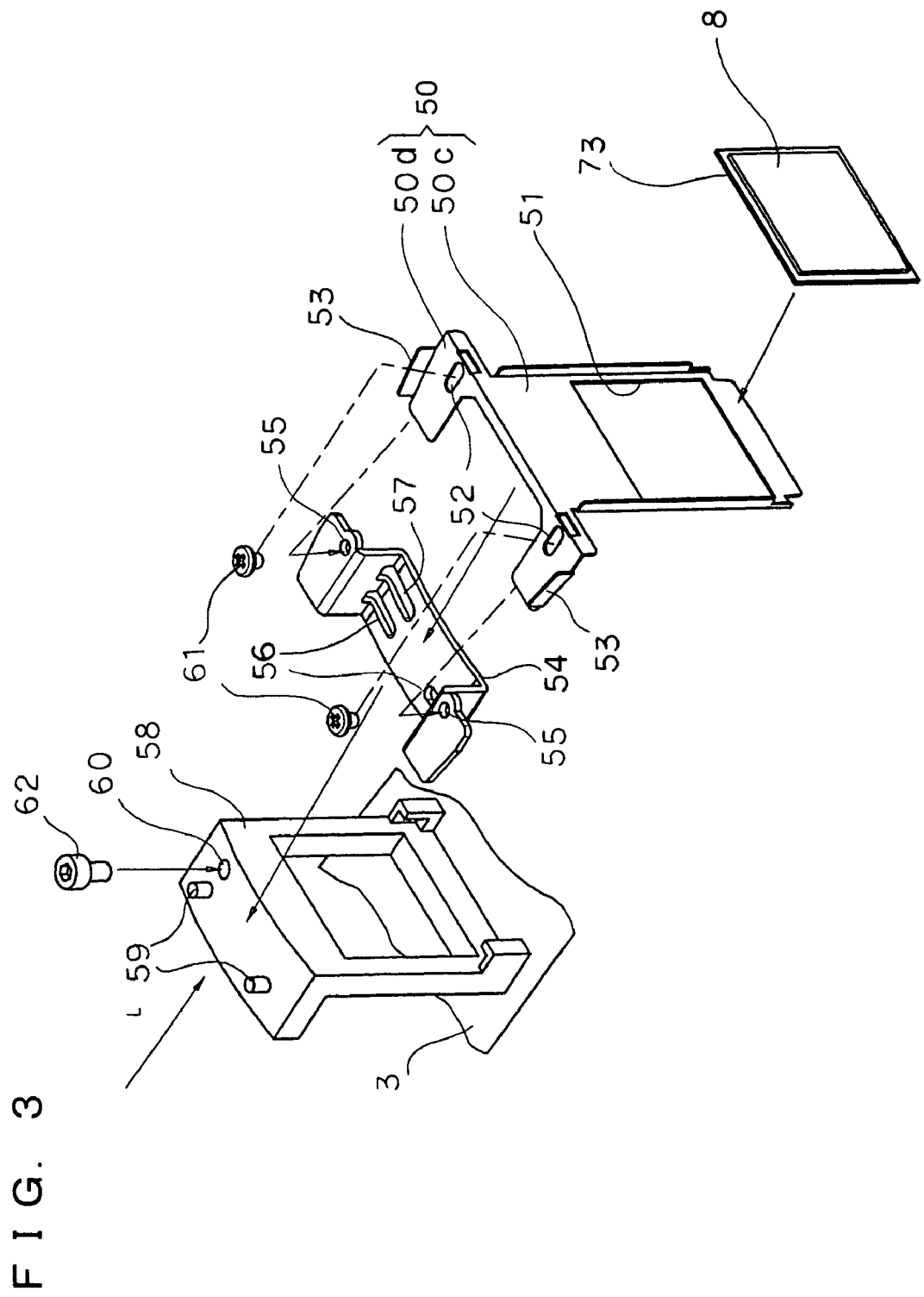
FIG. 3 is an exploded perspective view of a swing mechanism of the projector.

FIG. 3 is an exploded perspective view showing a mechanism of swinging the incidence-side optical compensation sheet 8. A swing member 50 is formed in an almost L shape by linking a vertical plate 50c and a horizontal plate 50d. A transmission hole 51 is formed in a position corresponding to the optical axis L in the vertical plate 50c, and the incidence-side polarizing plate 73 to which the incidence-side optical compensation sheet 8 is adhered is fit in the transmission hole 51. A pair of long holes 52 almost parallel to the optical axis L is formed in the horizontal plate 50d. Handles 53 operated by an adjustment worker are formed at both ends of the horizontal plate 50d.

In an assisting member 54 attached to the swing member 50, screw holes 55 and 55 in which screws 61 and 61 to be described later are screwed are formed in positions corresponding to the long holes 52 and 52. In the assisting member 54, a pair of long holes 56 and 56 and one long hole 57 extending in the direction almost orthogonal to the optical axis L are formed.

Figure 5:
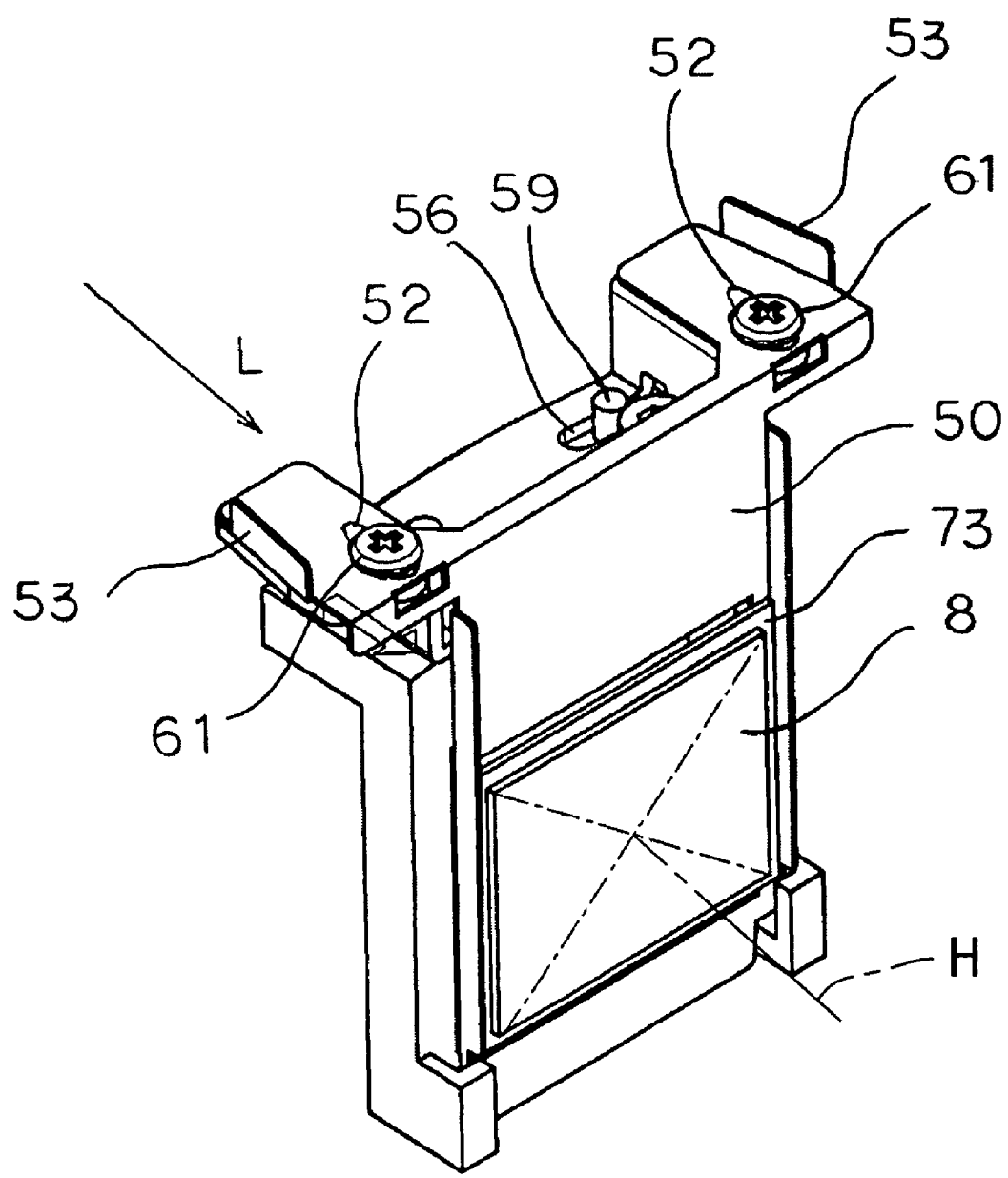
FIG. 5 is a perspective view showing the swing mechanism of the projector.

As shown in FIGS. 4 and 5, the swing member 50 is attached to a fixing member 58 formed upright on the chassis 3 via the assisting member 54. The top face of the fixing member 58 is formed in an arc shape, and the swing member 50 swings in a plane almost orthogonal to the optical axis L along the arc-shaped top face as will be described later.

A pair of guide shafts 59 is projected in positions corresponding to the long holes 56, on the top face of the fixing member 58. A screw hole 60 in which a screw 62 which will be described later is screwed is formed in a position corresponding to the long hole 57.

The assisting member 54 is fixed to the swing member 50 to which the incidence-side optical compensation sheet 8 is attached by the screw 61 fit in the long hole 52. The guide shafts 59 are fit in the long holes 56, and the swing member 50 is attached to the fixing member 58 by screwing the screw 62 into the long hole 57, thereby constructing the swing mechanism (refer to FIGS. 3 to 6).

Swing Adjustment

Figure 6:
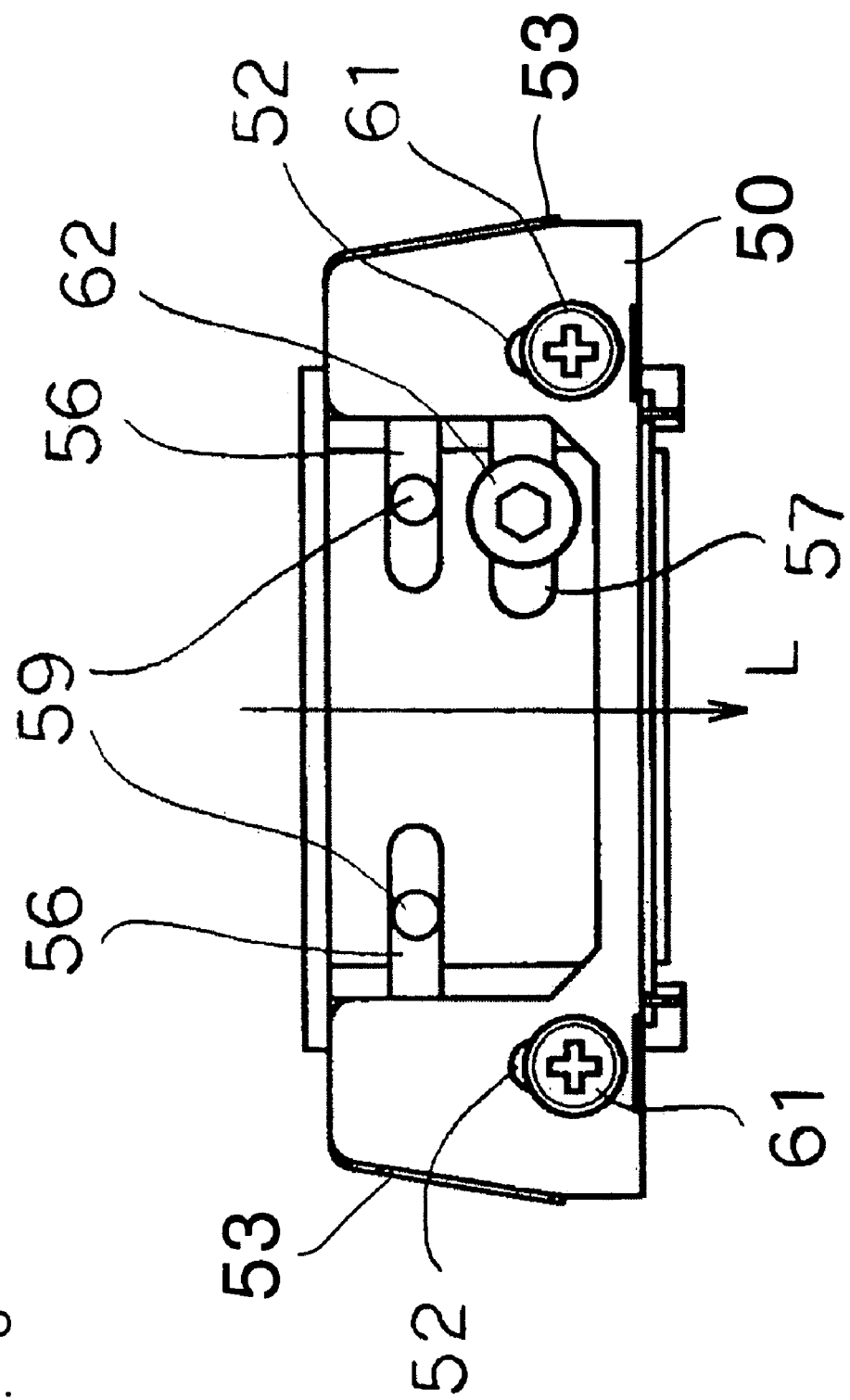
FIG. 6 is atop view of the swing mechanism of the projector.

At the time of adjusting the optical compensation sheet 8 by swinging, the screw 62 in FIG. 6 is unfastened, and the swing member 50 is slid along the long holes 56 in the direction orthogonal to the optical axis L. The swing member 50 slides along the arc-shaped top face of the fixing member 58. In such a manner, the incidence-side optical compensation sheet 8 can be swung in the plane orthogonal to the optical axis L.

Tilt Adjustment

When one of the screws 61 is unfastned and the swing member 50 is slid along the long hole 52, the swing member 50 swings around the other screw 61 as a center. The direction of the incidence-side optical compensation sheet 8 is adjusted so that the normal H of the optical compensation sheet 8 is tilted from the optical axis L. In such a manner, by the swing mechanism, the incidence-side optical compensation sheet 8 can be swung in the plane orthogonal to the optical axis L, and the direction of the incidence-side optical compensation sheet 8 can be adjusted so that the normal H is inclined from the optical axis L.

The incidence-side optical compensation sheet 8 is adjusted as follows. Light is emitted from the light source 35 to display an image onto the screen 37 via the projection lens 36. To make the contrast between black and white in the image clear, the handles 53 are operated to swing the swing member 50 in the direction orthogonal to the optical axis L so that the normal H of the optical compensation sheet 8 is tilted from the optical axis L.

Since the incidence-side optical compensation sheet 8 can be swingably adjusted in a plane orthogonal to the optical axis L, the slow axis of the liquid crystal molecules in the optical compensation sheet 8 when seen from the optical axis L direction can be set to be almost parallel with the alignment direction of the liquid crystal molecules in the liquid crystal panel 7. The incidence-side optical compensation sheet 8 can be adjusted in the direction in which the normal H is tilted from the optical axis L, so that the apparent slow axis of the optical compensation sheet 8 can be matched with the slow axis in the direction of the optical axis L direction of the liquid crystal molecules in the liquid crystal panel 7. As a result, an uniform image whose contrast between black and white is clear can be obtained.

Since the direction of the optical compensation sheet is adjusted, it is unnecessary to prepare various optical compensation sheets having optical axes according to viewing angle characteristics of liquid crystal panels. Consequently, a problem such as unnecessary stocks of optical compensation sheets can be solved. By integrating the incidence-side polarizing plate 73 and the incidence-side optical compensation sheet 8, the configuration is simplified and can be made compact.

Further, the incidence-side optical compensation sheet 8 is disposed for the swing member 50 which is swingable in the plane orthogonal to the optical axis L and whose normal H can be tilted from the optical axis L. Therefore, with the simple configuration, the incidence-side optical compensation sheet 8 can swing in the plane orthogonal to the optical axis L and can be adjusted so that its normal H is tilted from the optical axis L.

By disposing the incidence-side optical compensation sheet 8 on the light incidence side of the liquid crystal panel 7, deviation of the optical axis L can be prevented.

The optical compensation sheet 8 which can swing in the plane orthogonal to the optical axis L and whose normal H is adjusted so as to be tilted from the optical axis L is provided for a panel unit. Thus, a panel unit capable of always displaying a uniform image stably can be constructed.

The applicant of the invention obtained the contrast ratio between black and white after adjustment of the incidence-side optical compensation sheet 8 and the incidence-side polarizing plate 73 and confirmed the effects of the first embodiment. First, the light source 35 is allowed to emit light and white is displayed on the screen 37 without applying an electric field to the liquid crystal panel 7. As shown in FIG. 7, the screen 37 is divided into nine portions, illuminance in the center of each of the divided portions is measured, and an average value of illuminance (unit:lux) in the center of the nine portions is obtained and used as white screen illuminance (Wave).

Next, an electric field is applied to the liquid crystal panel 7 to display a black image on the screen 37. In a manner similar to the above, the screen 37 is divided into nine portions, illuminance in the center of each of the nine portions is measured, and an average value of illuminance in the center of the nine portions is obtained and used as black screen illuminance (BKave). The ratio between Wave and BKave, that is, the contrast was computed and the result was about 950:1.

The CIE chromaticity in the black screen was measured in the divided nine portions. As a result, variations (Δx, Δy) of values (x, y) were (0.025, 0.085) in the case where the incidence-side optical compensation sheet 8 is adjusted by being swung only in the plane orthogonal to the optical axis L. The variations were (0.024, 0.056) in the case where the incidence-side optical compensation sheet 8 is adjusted by being tilted from the optical axis L and by being swung in the plane orthogonal to the optical axis L. Thus, a uniform image with reduced variations could be projected.

In the first embodiment, the optical compensation sheet 8 is disposed on the light incidence side of the liquid crystal panel 7. An optical compensation sheet may be also disposed on the light outgoing side of the liquid crystal panel 7.

The configuration of adjusting the incidence-side optical compensation sheet 8 by swinging is not limited to that of the first embodiment, but other configurations may be used.

Second Embodiment

Figure 8:
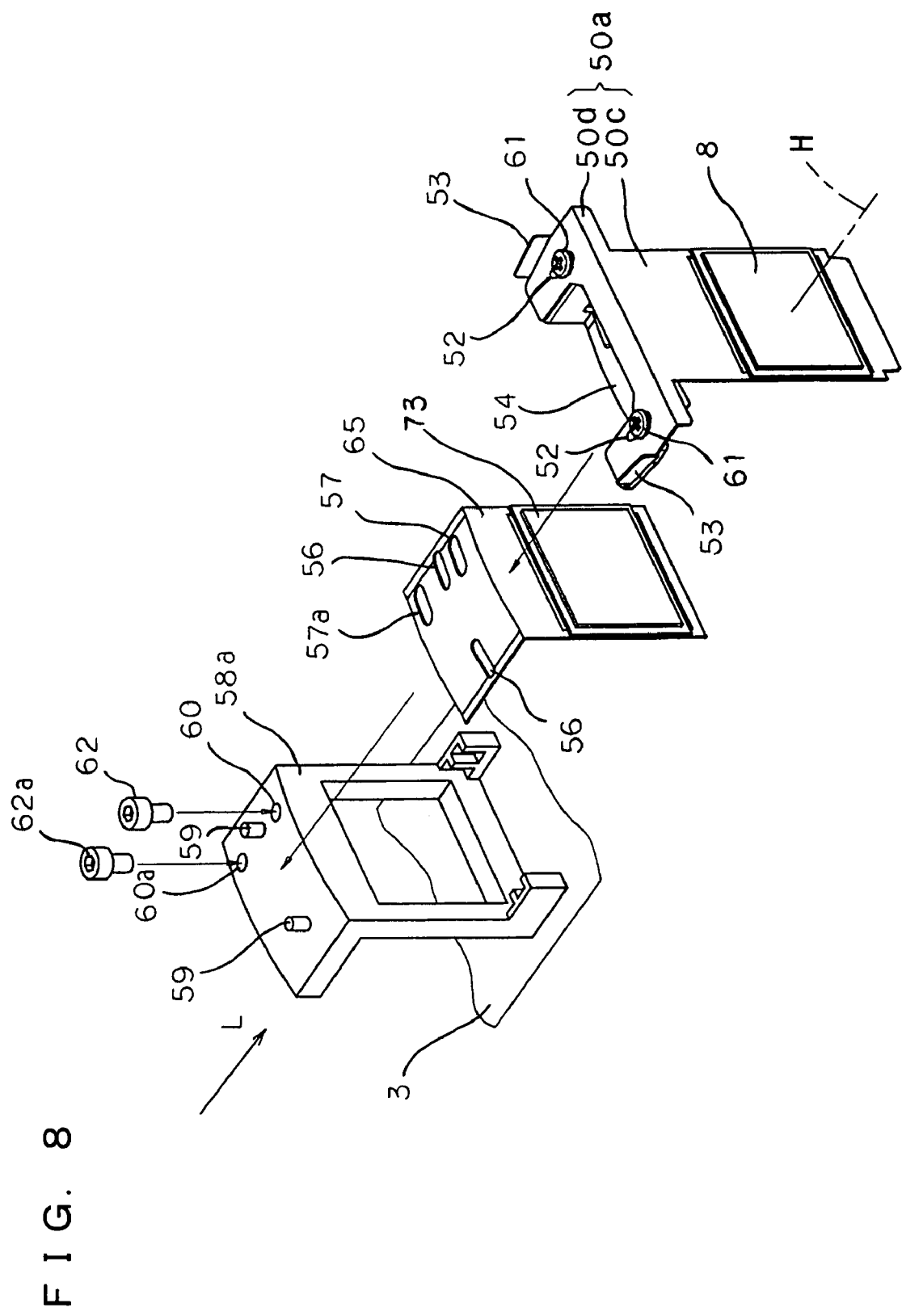
FIG. 8 is an exploded perspective view of a swing member to which an incidence-side polarizing plate and an incidence-side optical compensation sheet of a projector of a second embodiment of the invention are attached.
Figure 9:
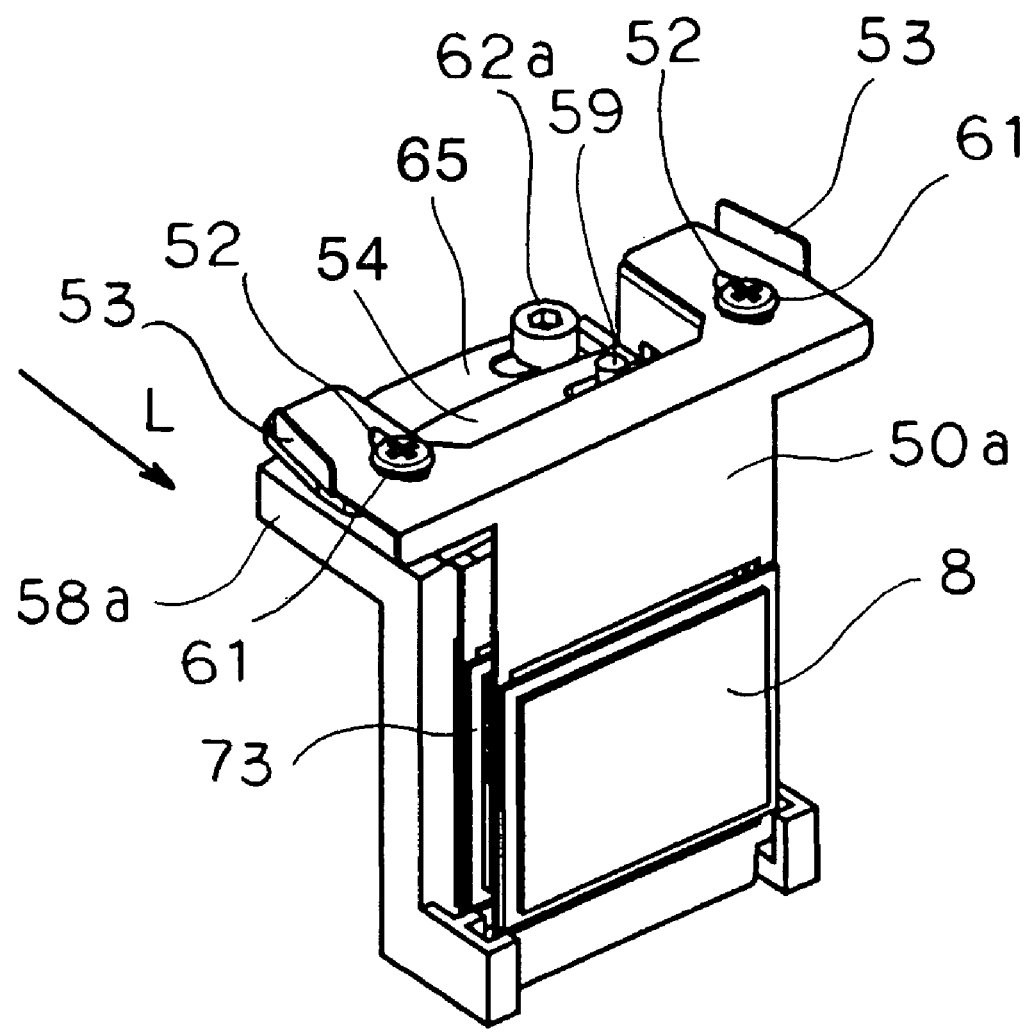
FIG. 9 is a perspective view of the swing mechanism of the projector.
Figure 10:
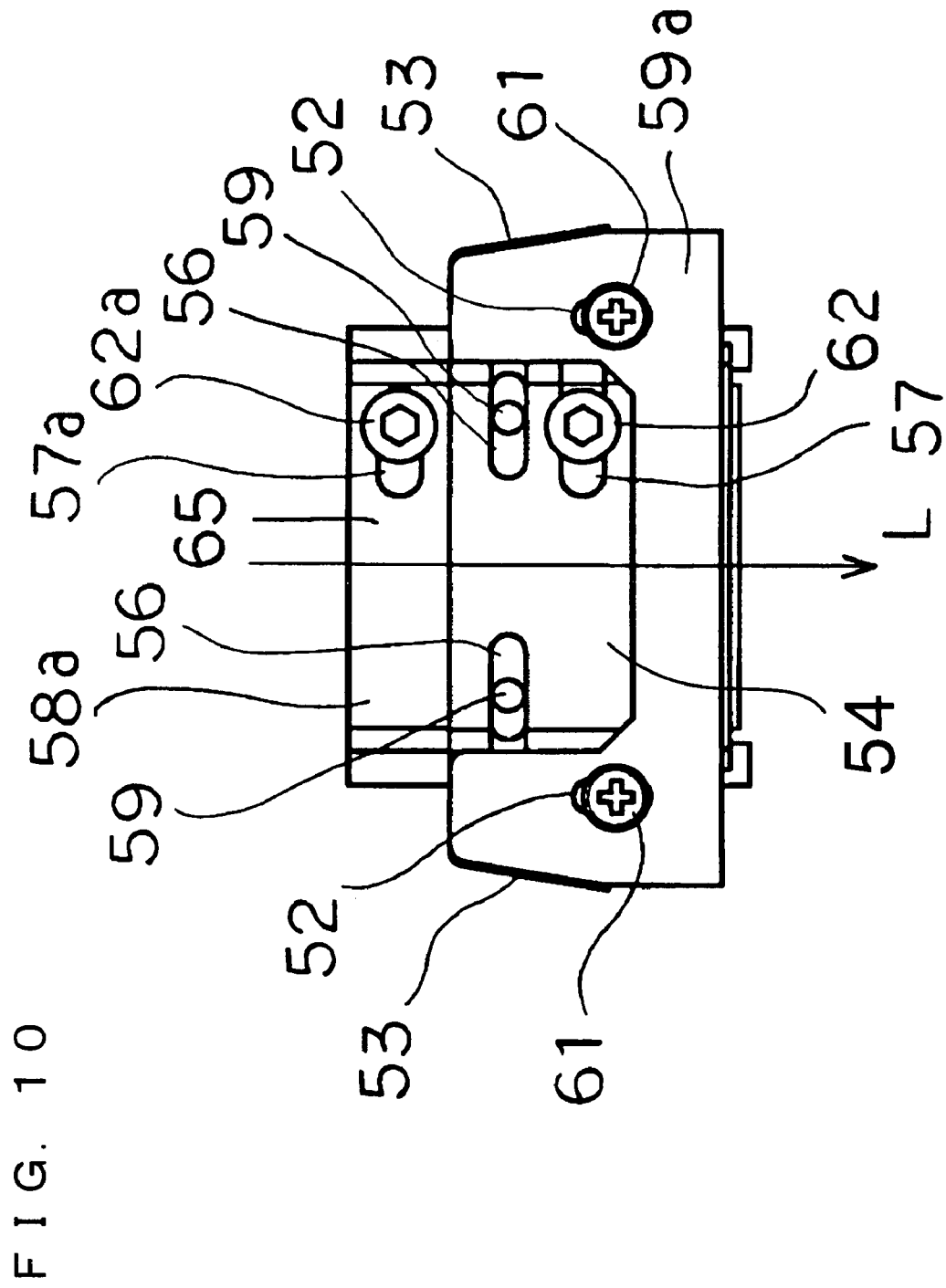
FIG. 10 is a plan view of the swing mechanism of the projector.
Figure 12:
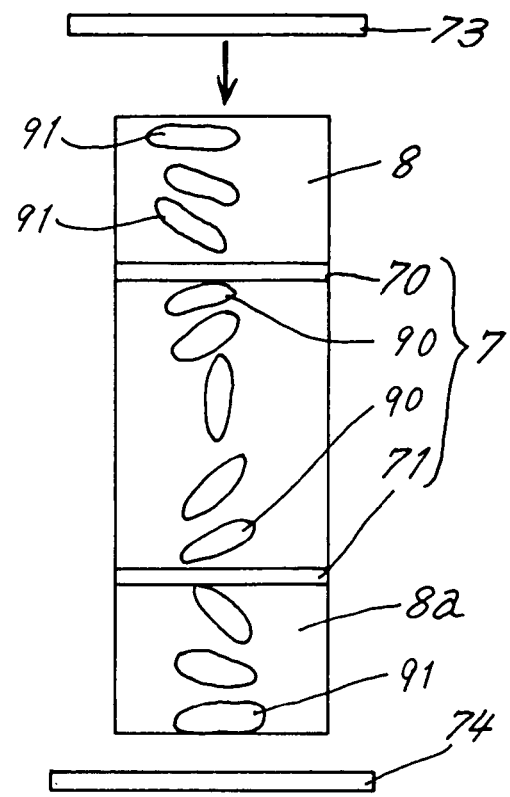
FIG. 12 is across section of an optical compensation sheet.
Figure 13:
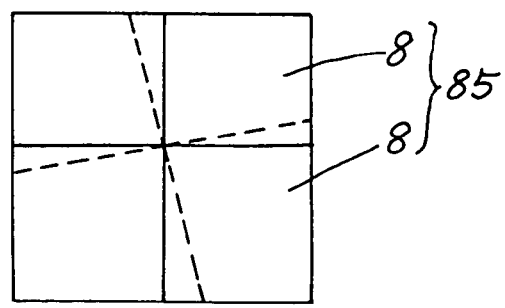
FIG. 13 is a plan view of a film sheet.

FIGS. 8 to 10 show a second embodiment of the present invention. The same reference numerals are designated to the same parts as those of the first embodiment and their description will not be repeated. The assisting member 54 is attached to a swing member 50a. The assisting member 54 is the same as that in the first embodiment.

The optical compensation sheet 8 of the second embodiment is disposed on the light incidence side of the liquid crystal panel 7 in a manner similar to the first embodiment. The polarizing plate 73 is attached to a moving member 65, and the moving member 65 is constructed swingable in a plane orthogonal to the optical axis L. The swing member 50a to which the optical compensation sheet 8 is attached is constructed swingable in the plane orthogonal to the optical axis L with respect to the moving member 65, and the normal H of the swing member 50a is adjustable so as to be tilted from the optical axis L.

The optical compensation sheet 8 is attached to the vertical plate 50c of the swing member 50a in correspondence with the optical axis L. In the horizontal plate 50d of the swing member 50a, the pair of long holes 52 and 52 almost parallel with the optical axis L are formed. At both ends of the top face of the swing member 50a, the handles 53 and 53 are formed.

As shown in FIG. 8, in the moving member 65, the pair of long holes 56 and 56 extending in the direction almost orthogonal to the optical axis L, the long hole 57, and a second long hole 57a are formed. The swing member 50a is attached to a fixing member 58a provided upright on the chassis 3 via the moving member 65. The top face of the fixing member 58a is formed in an arc shape, and the swing member 50a and the moving member 65 swing in a plane orthogonal to the optical axis L along the arc-shaped top face.

The pair of guide shafts 59 is projected in positions corresponding to the long holes 56, on the fixing member 58a. The screw hole 60 in which the screw 62 which will be described later is screwed is formed in a position corresponding to the long hole 57, and a screw hole 60a in which a screw 62a which will be described later is screwed is formed in a position corresponding to the long hole 57a.

The swing member 50a constructed as described above is fixed to the fixing member 58a via the moving member 65 by the screw 62a. At this time, the guide shafts 59 are fit in the long holes 56.

Swing Adjustment

When the screw 62 is unfastened and the swing member 50a is slid along the long holes 56 in the direction orthogonal to the optical axis L, the optical compensation sheet 8 can be adjusted by being swung in the plane orthogonal to the optical axis L.

Tilt Adjustment

When one of the pair of screws 61 is unfastened and the swing member 50a is slid along the long hole 52, the incidence-side optical compensation sheet 8 can be swung around the other screw 61 as a center. Specifically, the optical compensation sheet 8 is adjusted so that its normal H is tilted from the optical axis L. In such a manner, the incidence-side optical compensation sheet 8 can be adjusted so as to be tilted from the optical axis L, and its normal H can be adjusted so as to be tilted in the plane orthogonal to the optical axis L. By unfastening the screw 62a and making the moving member 65 slide along the long hole 56 in the direction orthogonal to the optical axis L, the polarizing plate 73 can be adjusted so as to be swung in the plane orthogonal to the optical axis L.

The incidence-side optical compensation sheet 8 is adjusted as follows in a manner similar to the first embodiment. Light is emitted from the light source 35 to display an image onto the screen 37 via the projection lens 36. To make the contrast between black and white in the image clear, the handles 53 are operated to swing the swing member 50 in the direction tilted from the optical axis L and in the direction orthogonal to the optical axis L.

In a manner similar to the first embodiment, after the adjustment of the optical compensation sheet 8 and the polarizing plate 73, the contrast ratio between black and white was computed and an effect of the second embodiment was recognized. The effect similar to that of the first embodiment could be confirmed. The CIE chromaticity in the black screen was measured. As a result, variations (Δx, Δy) of values (x, y) could be reduced in a manner similar to the first embodiment, and a uniform image with reduced variations could be projected.

Further, in the second embodiment, the polarizing plate 73 and the optical compensation sheet 8 can be disposed so as to be apart from each other. With the configuration, the effect of cooling the polarizing plate 73 and the optical compensation sheet 8 can be improved, and the life of the polarizing plate 73 and the optical compensation sheet 8 can be increased. Since the polarizing plate 73 and the optical compensation sheet 8 are separately constructed, in the case one of the polarizing plate 73 and the optical compensation sheet 8 degrades and is replaced, it is sufficient to replace only the part which has to be replaced. As a result, it becomes unnecessary to replace an unnecessary part.

What is claimed is:

1. A projector comprising:
   a liquid crystal panel in which liquid crystal molecules to be irradiated with light from a light source are sealed;

a polarizing plate disposed in a position to face the liquid crystal panel; and an optical compensation sheet disposed between the polarizing plate and the liquid crystal panel and compensating birefringence of the liquid crystal molecules, wherein the optical compensation sheet can be adjusted by being swung in a plane orthogonal to an optical axis of the liquid crystal display panel and its normal can be adjusted so as to be tilted from the optical axis, said tilting occurs on an axis located at an edge of said optical compensation sheet.

2. The projector according to claim 1, wherein the optical compensation sheet is disposed on a light incidence side of the liquid crystal panel.

3. The projector according to claim 1, wherein the optical compensation sheet is disposed for a swing member which can be adjusted by being swung in a plane orthogonal to the optical axis and whose normal can be adjusted so as to be tilted from the optical axis.

4. The projector according to claim 3, wherein a polarizing plate is disposed for the swing member.

5. A liquid crystal panel unit comprising:

a liquid crystal panel in which liquid crystal molecules to be irradiated with light from a light source are sealed;

a polarizing plate disposed in a position to face the liquid crystal panel; and an optical compensation sheet disposed between the liquid crystal panel and the polarizing plate and compensating birefringence of the liquid crystal molecules, wherein the optical compensation sheet can be adjusted by being swung in a plane orthogonal to an optical axis of the liquid crystal display panel and its normal can be adjusted so as to be tilted from the optical axis, said tilting occurs on an axis located at an edge of said optical compensation sheet.

* * * * *